(12) United States Patent
Oishi

(10) Patent No.: US 6,980,397 B2
(45) Date of Patent: Dec. 27, 2005

(54) DISK CARTRIDGE HAVING A HOUSING WITH AN APERTURE FOR HOLDING A VIBRATION DAMPING MEMBER

(75) Inventor: Kengo Oishi, Odawara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 101 days.

(21) Appl. No.: 10/463,548

(22) Filed: Jun. 18, 2003

(65) Prior Publication Data
US 2003/0235009 A1    Dec. 25, 2003

(30) Foreign Application Priority Data
Jun. 20, 2002    (JP) .............................. 2002-179344

(51) Int. Cl.⁷ .......................................... G11B 17/028
(52) U.S. Cl. ...................................... 360/133; 720/728
(58) Field of Search ...................... 360/133; 720/725, 720/726, 728, 737

(56) References Cited

U.S. PATENT DOCUMENTS 4,777,550 A * 10/1988 Taguchi et al. .......... 360/99.06
5,898,664 A * 4/1999 Kikuchi et al. ............. 720/728
6,480,461 B1 * 11/2002 Watanabe et al. ........... 720/726

FOREIGN PATENT DOCUMENTS

JP    2001-143361 A  *  5/2001

* cited by examiner

Primary Examiner—Jefferson Evans
(74) Attorney, Agent, or Firm—Sughrue Mion, PLLC

(57) ABSTRACT

In order to improve quality of recording/reproducing signals by preventing degradation of the quality of the recording/reproducing signals due to vibration transmitted from the exterior of a disk cartridge which contains a discoid medium, the disk cartridge performs the following: reference pins are inserted into reference pin insertion entrances and located on the lower side of a housing. These reference pins press the housing onto a reference plate, and the disk cartridge is placed in a recording/reproducing device. Vibration damping members are provided at portions in contact with the reference pins. These vibration damping members are rendered to absorb the vibration transmitted from the exterior of the cartridge through the reference pins. By preventing the discoid media from vibrating in the vicinity of an opening portion, the quality of the recording/reproducing signals are improved.

8 Claims, 2 Drawing Sheets

DISK CARTRIDGE HAVING A HOUSING WITH AN APERTURE FOR HOLDING A VIBRATION DAMPING MEMBER

BACKGROUND OF THE INVENTION

1. Field of the Invention

The present invention relates to a disk cartridge in which a discoid medium is contained in a case.

2. Description of the Related Art

As electronic apparatuses such as audio apparatuses, digital cameras, digital video cameras and personal computers proliferate rapidly, different types of recording media (hereinafter, referred to as media) for use in those kinds of apparatuses have been proposed and have been in practical use nowadays. As for those media, inexpensive small media with large capacities have been desired to be realized from the viewpoints of portability, utility and cost efficiency.

Different types of media including a semiconductor memory, hard disk, optical disk and magnetic disk are examples of media currently in use. Among those, since the discoid media such as the optical and magnetic disks have large recording capacities in spite of their small size and are relatively inexpensive, they are most proliferated at present. Note that these discoid media are usually contained in housings and used as disk cartridges.

A floppy disk, an MD cartridge, an MO cartridge, and CLIX!(registered trademark) are examples of media which are used as the disk cartridges in which discoid media are contained in the housings.

Incidentally, signals are recorded/reproduced onto/from the discoid medium contained in the disk cartridge by allowing a recording/reproducing head, which is provided in a recording/reproducing device, to approach a signal recording surface of the discoid media. However, if vibration from the exterior of the recording/reproducing device or mechanical vibration generated in the interior of the recording/reproducing device is transmitted to the disk cartridge through a contact portion with the disk cartridge in the recording/reproducing device, the discoid medium contained in the cartridge vibrates. Accordingly, a positional relationship between the discoid medium and the recording/reproducing head becomes unstable. Therefore, the quality of the recording signal or the reproducing signal is degraded.

SUMMARY OF THE INVENTION

The present invention has been developed by taking account of the above problem. It is an object of the present invention to improve the quality of recording and reproducing signals by preventing vibration, which is transmitted from the exterior of a disk cartridge containing a discoid medium, from degrading the quality of the recording and reproducing signals.

A disk cartridge according to the present invention is provided with a rotatable discoid medium, a housing and a shutter. The housing contains the discoid medium and is provided with an opening portion for a recording/reproducing head of a recording/reproducing device. The shutter opens/closes the opening portion. The shutter is moved to a position where the opening portion is opened by a shutter opening/closing member of the recording/reproducing device, upon insertion of the disk cartridge into the recording/reproducing device. The disk cartridge is characterized in that the housing has a vibration damping member which absorbs vibration transmitted from the recording/reproducing device while the cartridge is placed in the recording/reproducing device.

The above vibration damping member has low temperature and frequency dependency and excellent vibration damping characteristics. Moreover, the vibration damping member is preferably made of M2052 alloy (Mn 73%, Cu 20%, Ni 5% and Fe2% (atom %)) with a good workability.

According to the disk cartridge of the present invention, the vibration damping member is provided in the housing to absorb vibration transmitted from the recording/reproducing device while the disk cartridge is placed in the recording/reproducing device. Accordingly, generation of the vibration of the discoid medium with respect to the recording/reproducing head provided in the recording/reproducing device can be prevented. Thus, it is possible to improve the quality of the recording/reproducing signal by preventing degradation of the recording and reproducing signals due to the vibration.

DESCRIPTION OF THE PREFERRED EMBODIMENTS

Figure 1:
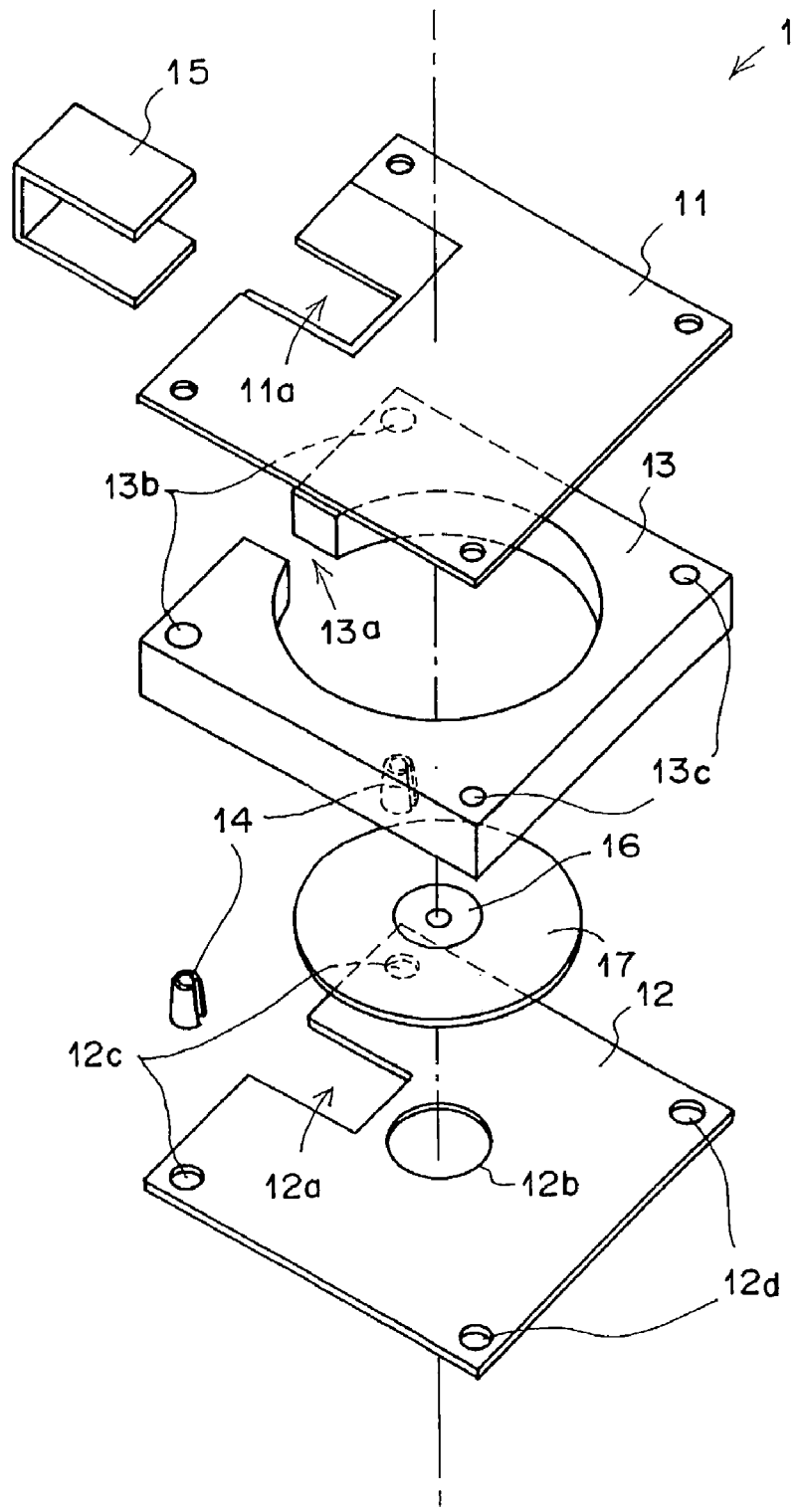
FIG. 1 is a structural diagram of a disk cartridge according to an embodiment of the present invention.
Figure 2:
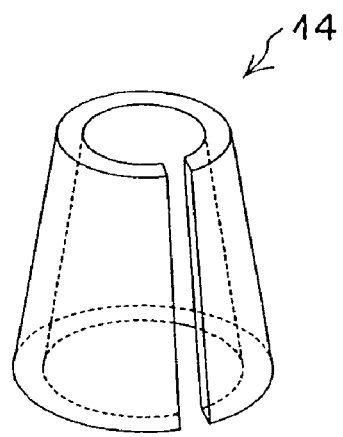
FIG. 2 is a schematic diagram of a vibration damping member of the disk cartridge of FIG. 1.
Figure 3:
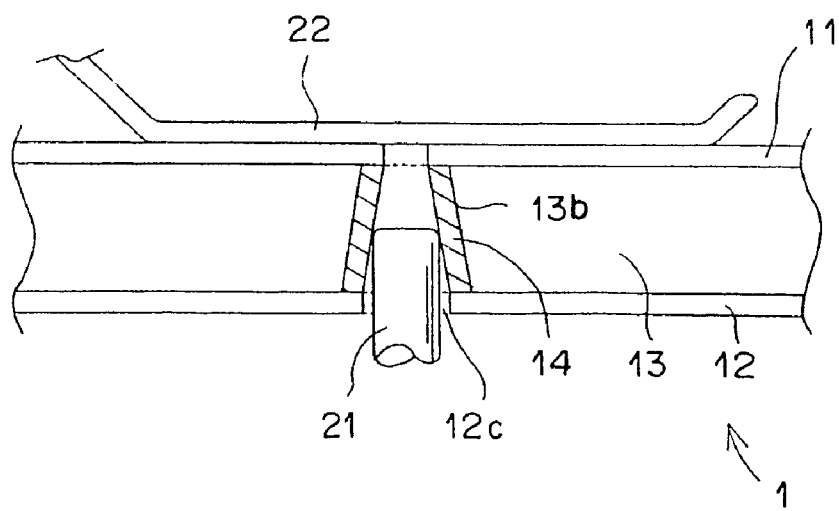
FIG. 3 is a sectional view of the vicinity of the vibration damping member when the disk cartridge of FIG. 1 is placed in a recording/reproducing device.

An embodiment of the present invention is detailed below with reference to the drawings. FIG. 1 is a structural diagram of a disk cartridge according to an embodiment of the present invention. FIG. 2 is a schematic diagram of the vibration damping member of the disk cartridge. FIG. 3 is a sectional view of the vicinity of the vibration damping member when the disk cartridge is placed in a recording/reproducing device.

A disk cartridge 1 has a thin flat housing. A rotatable discoid medium 17, which is fixed to and held by a center core 16, is incorporated into the housing.

The above housing is structured such that a cartridge body 13, in which vibration damping members 14 are held in vibration damping member holding apertures 13b, is sandwiched between an upper plate 11 and a lower plate 12.

The upper plate 11 is provided with an opening portion 11a for a recording/reproducing head of the recording/reproducing device to access the discoid medium 17.

The lower plate 12 has an opening portion 12a, a spindle insertion entrance 12b and four reference pin insertion entrances 12c and 12d. The opening portion 12a is similar to the above opening portion 11a. The spindle insertion entrance 12b is for inserting a spindle provided in the recording/reproducing device. The reference pin insertion entrances 12c and 12d are for inserting reference pins 21 provided on the recording/reproducing device therein.

As specifically shown in FIG. 2, the vibration damping members 14 have larger diameters in the lower parts thereof than that in the upper parts thereof. The vibration damping members 14 have an approximately cylindrical shape with an opening on a side thereof. The vibration damping members 14 are formed such that the inside of the cylinder functions as the reference pin holding apertures. In addition, the vibration damping members 14 are molded from an elastic material and enabled to deform so as to increase or decrease the diameters of the cylinder.

Note that rubber, lead, resin and the like are available as materials that mold the vibration damping members 14. Among those, it is hard to ensure shape dimension precision with the rubber and lead. Accordingly, there would be a problem if the rubber and lead were used as part of mechanical components of the cartridge and the like. In addition, high polymer materials such as resin have good vibration damping properties, but strength thereof is remarkably low. Accordingly, if high polymer materials are neglected while some weight is applied thereto, dimensions thereof change. This is known as a creep phenomenon. Therefore, high polymer materials are not suitable for use in a part of the mechanical components of the cartridge and the like. Thus, in order to overcome those problems and maintain stable vibration damping effect for a long period of time, it is desirable to use metals, especially a so-called vibration damping alloy.

This vibration damping alloy is classified into composite, ferromagnetic, transferring, and twin crystal types. Among those, composite (cast iron) and ferromagnetic (Ni, Fe—Cr, fe—Cr—Al and the like) types are unsuitable for use in the cartridge which contains a recording medium (especially, a magnetic recording medium) since the composite and ferromagnetic types have problems in workability and magnetism. As a result, it is desirable to use vibration damping alloy of the transferring or twin crystal type, especially M2052 alloy (Mn 73%, Cu 20%, Ni 5%, Fe 2% (atom %)) of the twin crystal type. M2052 alloy has low temperature and frequency dependency and a good vibration damping properties. In addition, M2052 alloy also has a good workability. Therefore, M2052 alloy is suitable for use in the cartridge of the present invention.

A cartridge body 13 is provided with an opening portion 13a, vibration damping member holding apertures 13b, and reference pin holding apertures 13c. The opening portion 13a is for the recording/reproducing head of the recording/reproducing device to access the discoid media. The vibration damping member holding apertures 13b are for holding the above vibration damping members 14 and provided for both edges on the side of opening portion 13a. The inner dimension of the vibration damping member holding apertures 13b is slightly larger than the outer dimension of the vibration damping members 14 in order to enable the vibration damping members 14 to deform.

In addition, the aforementioned housing is provided with a slidable shutter 15 having approximately U-shaped side thereof to open/close the aforementioned opening portions 11a, 12b and 13a. A shutter opening/closing member provided in the recording/reproducing device automatically opens/closes the shutter 15 when the disk cartridge 1 is inserted/removed into/from the recording/reproducing device.

As shown in FIG. 3, the reference pins 21 are inserted into the reference pin insertion entrances 12c and 12d located on the lower side of the disk cartridge 1. The disk cartridge 1 which is constituted as described above is pressed onto the reference plate 22 by these reference pins 21 and is placed in the recording/reproducing device.

At this time, the reference pins 21 that have been inserted into the reference pin insertion entrances 12c arranged on both sides of the opening portion are not directly in contact with the cartridge body 13, but with the vibration damping members 14. Accordingly, vibration transmitted from the exterior of the cartridge 1 through the reference pins 21 is absorbed by these vibration absorbing members 14. Thus, it is possible to prevent the discoid medium 17 contained in the cartridge 1 from vibrating in the vicinity of the opening portion.

Therefore, a wobble of the discoid medium 17 with respect to the recording/reproducing head provided in the recording/reproducing device can be prevented. Accordingly, it is possible to improve the quality of the recording/reproducing signals by preventing degradation of the recording/reproducing signals due to this wobble.

What is claimed is:

1. A disk cartridge comprising:
   a rotatable discoid medium;
   a housing for containing the discoid medium and provided with an opening portion for a recording/reproducing head of a recording/reproducing device; and
   a shutter for opening/closing the opening portion, the shutter being moved to a position where the opening portion is opened by a shutter opening/closing member of the recording/reproducing device accompanied by insertion of the disk cartridge into the recording/reproducing device,
   wherein the housing includes a vibration damping member which absorbs vibration transmitted from the recording/reproducing device in a state where the disk cartridge is placed in the recording/reproducing device, and
   wherein said housing comprises:
   a cartridge body having an aperture for holding said vibration damping member; and
   upper and lower plates that sandwich said cartridge body.

2. A disk cartridge as defined in claim 1, wherein:
   said upper and lower plates are provided with openings for the recording/reproducing head to access said discoid medium therethrough; and
   said lower plate is further provided with a spindle insertion opening for insertion of a spindle of said recording/reproducing device.

3. A disk cartridge as defined in claim 2, wherein:
   said disk cartridge is substantially rectangular in shape;
   said opening portion is provided at one side of said disk cartridge;
   reference pin holding apertures for insertion of reference pins of said recording/reproducing device therethrough are provided in the vicinity of the four corners of said disk cartridge; and
   said vibration damping member is held within at least the two reference pin holding apertures that are on either side of said opening portion.

4. A disk cartridge as defined in claim 3, wherein:
   said vibration damping member has a larger diameter at the lower part thereof than that of the upper part thereof.

5. A disk cartridge as defined in claim 4, wherein said vibration damping member is of a cylindrical shape with an opening on a side thereof.

6. A disk cartridge as defined in claim 5, wherein said vibration damping member is formed such that the interior thereof functions as said reference pin holding aperture.

7. A disk cartridge as defined in claim 5, wherein said vibration damping member comprises a vibration damping metal alloy.

8. A disk cartridge as defined in claim 7, wherein said vibration damping metal alloy is M2052 alloy.

* * * * *